United States Patent [19]
Pirolli et al.

[11] Patent Number: 5,159,704
[45] Date of Patent: Oct. 27, 1992

[54] TRANSCEIVER ARRANGEMENT FOR OPTIMIZING RECEIVED SIGNAL LEVELS

[75] Inventors: Claude Pirolli, Rueil Malmaison; Roger Alexis, Neuilly Sur Seine; Marc Chelouche, Sannois, all of France

[73] Assignee: Telecommunications Radioelectriques et Telephoniques, Paris, France

[21] Appl. No.: 451,265

[22] Filed: Dec. 14, 1989

[30] Foreign Application Priority Data

Dec. 23, 1988 [FR] France ................................. 88 17111

[51] Int. Cl.$^5$ .................. H04B 17/00; H04B 1/40
[52] U.S. Cl. ...................... 455/62; 455/69; 455/75; 455/88; 455/113
[58] Field of Search ................ 455/10, 12–13, 455/52, 62, 67, 69, 75, 88, 113, 115, 127, 40; 375/58

[56] References Cited

U.S. PATENT DOCUMENTS

| | | | |
|---|---|---|---|
| 2,125,977 | 9/1938 | Zworykin | 342/368 |
| 3,160,813 | 12/1964 | Biggi et al. | 455/62 |
| 3,617,891 | 11/1971 | Covill | 455/52 |
| 4,695,842 | 9/1987 | Jehle et al. | 342/59 |

OTHER PUBLICATIONS

Marchand et al., "23 GHz Radio Equipments DTS 10–64 and FTD 23", *Commutation and Transmission*, No. 4 1986, pp. 29–38.
"Satellite Communications", Gagliardi, Robert M. Lifetime Learning Pub., May 1984, pp. 94–95.

*Primary Examiner*—Reinhard J. Eisenzopf
*Assistant Examiner*—Andrew Faile
*Attorney, Agent, or Firm*—Oblon, Spivak, McClelland, Maier & Neustadt

[57] ABSTRACT

An information transmission arrangement comprising transceiver units (1, 2) located in a propagation medium (10) whose attentuation varies as a function of frequency. At least one unit (1) comprise a meter (67) for measuring the level of the received signal in order to influence the frequency variation control (32) of the control oscillator (28) in the send circuit (26, 28) of the other unit (2). This arrangement profits from a monotonic attenuation gradient of the propagation medium (10) having a zone (Z1) in the 50–60 GHz band to control the send level in a simple and effective manner.

14 Claims, 2 Drawing Sheets

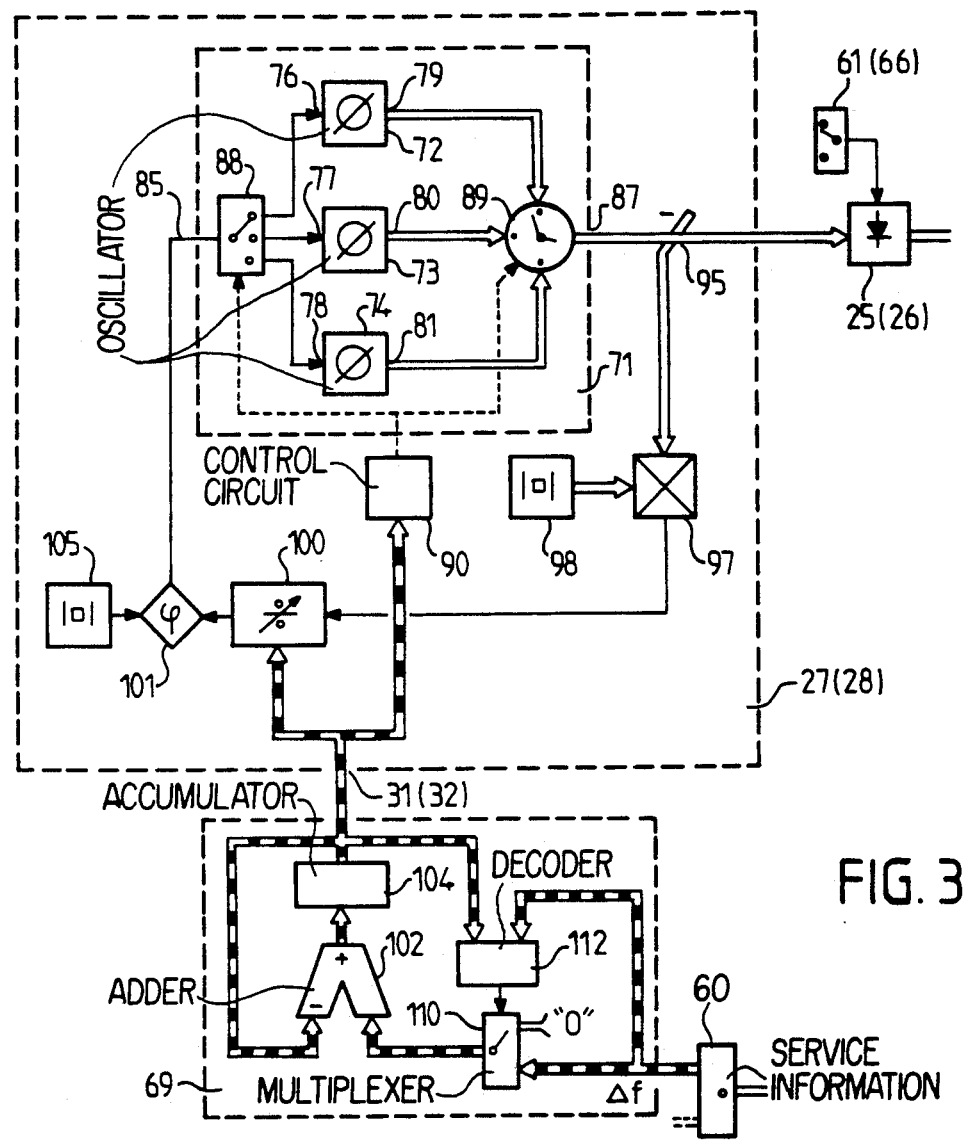
FIG. 3
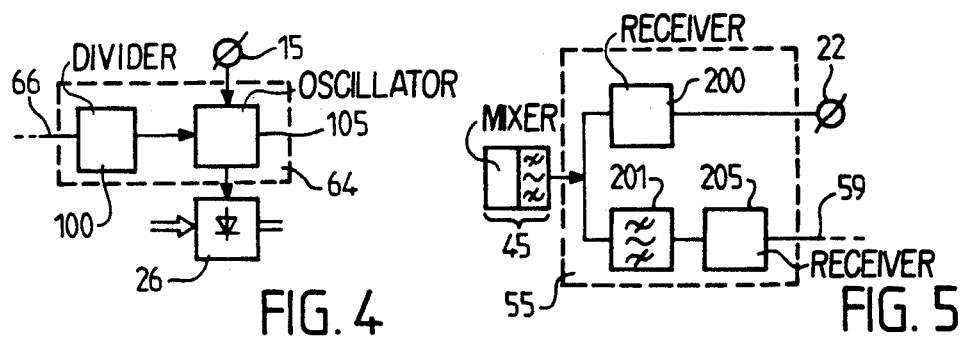
FIG. 4
FIG. 5

TRANSCEIVER ARRANGEMENT FOR OPTIMIZING RECEIVED SIGNAL LEVELS

BACKGROUND OF THE INVENTION

The present invention relates to an information transmission arrangement comprising at least a first and a second transceiver unit located in a propagation medium having an attenuation which varies as a function of a frequency used for the transmission, in which at least one of the units comprises a send section to send useful information by means of a carrier signal centered on a carrier frequency established via a control oscillator comprising a frequency variation controller, and in which at least the other unit comprises:

a receive section to receive the useful information sent by means of the carrier signal.

The field of application considered more particularly within the scope of the invention is transmission by means of radio channels or radio relay systems.

Such an arrangement is described in the article entitled "23 GHz Radio Equipments DTS 10-64 and FTD 23" by P. MARCHAND and E. FERNANDEZ published in the journal "Communication and Transmission", No. 4, 1986.

Although it gives entire satisfaction, this described arrangement does not fulfil requirements as to discretion and resistance to the jamming imposed by tactical applications. Worded differently, the purpose of the radio relay link is to reach the transceiver unit to which it is directed, while avoiding being intercepted by a nonauthorized receive unit and avoiding a send unit jamming the transmission between two transceiver units forming part of the arrangement.

SUMMARY OF THE INVENTION

According to the invention, in an arrangement as described above, at least one of the units comprises a meter for measuring the level of the received carrier signal in order to influence the frequency variation controller of at least one of said control oscillators, and the frequency variation is selected to be situated in a zone where the attenuation of the propagation medium presents a steep attenuation gradient which is generally monotonic—that is, the attenuation varies substantially always in a given direction as frequency increases within the zone.

An important characteristic feature of the invention, according to which the propagation medium is the earth's atmosphere and according to which said zone is situated between approximately 50 and 60 GHz, leads to the following important advantages:

the aerials have small dimensions and favourable directional characteristics, which is compatible with the requirements as to discretion, the selected frequency band provides a wide dynamic range of the received signal level which corresponds well with the first measure proposed by the invention.

It should be observed that this frequency band is known to be used by a radar arrangement (cf. on this subject U.S. Pat. No. 4,695,842). In this U.S. patent, however, one is not confronted with the problem posed of transmission in the framework of a radio relay system.

The following description together with the accompanying drawings, all given by way of non-limiting example, will make it better understood how the invention can be realized.

BRIEF DESCRIPTION OF THE DRAWING

FIG. 3 shows in detail elements of the arrangement represented in FIG. 1, FIG. 4 shows a multiplexing circuit for multiplexing the useful and service information; and FIG. 5 shows a demultiplexing circuit for demultiplexing the useful and service information.

DESCRIPTION OF THE PREFERRED EMBODIMENT

Figure 1:
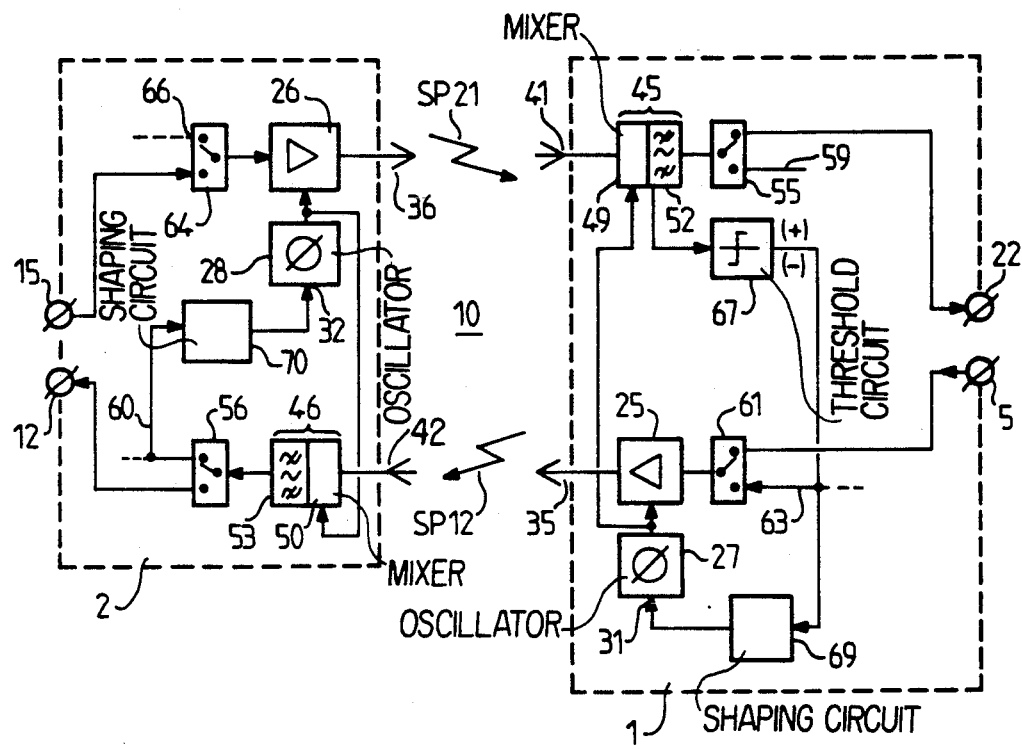
FIG. 1 shows an arrangement in accordance with the invention.

In FIG. 1 the references 1 and 2 represent transceiver units forming part of an arrangement according to the invention. These units exchange information in the mode commonly referred to as the full-duplex mode. Thus, the useful information available at an input terminal 5 of the unit 1 is sent through a transmission medium 10 and passed through to an output terminal 12 of the unit 2. Conversely, useful information available at an input terminal 15 of unit 2 passes to an output terminal 22 of unit 1. For transmission through the transmission medium 10 from unit 1 to unit 2 an electromagnetic carrier signal SP12 is used centered on a carrier frequency FP12. Similarly, for transmission from unit 2 to unit 1, a carrier signal SP21 centered on a carrier frequency FP21 is used. In order to generate the electromagnetic signals SP12 and SP21, each unit 1, 2 comprises a send circuit 25, 26 which is controlled by an oscillator 27, 28 comprising a frequency variation controller 31, 32 and having an output connected to the feed of the send antenna 35, 36.

In order to capture the signals SP21 and SP12 each unit 1, 2 comprises a receive antenna 41, 42 cooperating with a receive circuit 45, 46. According to well-defined rules this receive circuit 45, 46 comprises a mixer stage 49, 50 followed by an intermediate-frequency amplifier stage 52, 53, the value of this intermediate-frequency being FI. The mixer stage 49, 50 uses the output signal of the oscillator 27, 28 as described in the article mentioned hereinbefore. At the output of the receive circuit 45, 46 a two-position demultiplexer 55, 56 is provided applying in a first position the useful information to terminal 22, 12; and in a second position, applying over the line 59, 60 service information necessary for coordination of the links between the units 1 and 2, as this has been described in the above article. Similarly, unit 1 comprises a multiplexer 61 at the input of the send circuit 25, to insert the service information available on a line 63 into the stream of useful information and unit 2 comprises a multiplexer 64 to perform the same multiplexing operation of useful and service information on a line 66.

Figure 2:
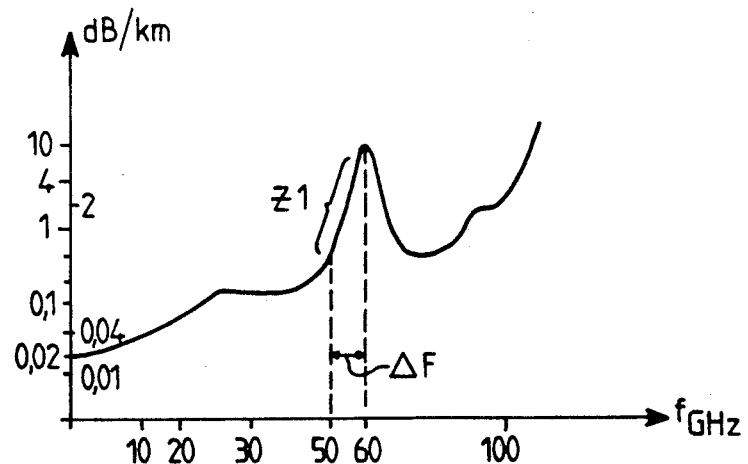
FIG. 2 shows the attenuation curve of the earth's atmosphere plotted against frequency.

In FIG. 2 is represented the attenuation curve in dB/km of the earth's atmosphere plotted against frequency.

In accordance with the invention a zone Z1 is selected which has a frequency interval $\Delta F$ between 50 GHz and 60 GHz in which the attenuation increases from approximately 0.3 dB/km to 14–16 dB/km. One has thus a steep attenuation gradient. As is clear from FIG. 2, the gradient is monotonic—it increases continuously with increase in frequency over the zone Z1. A meter for measuring the level of the received carrier signal is constituted by a threshold circuit 67 (see FIG. 1) comparing the automatic gain control signal derived from the receive circuit 45 to a reference value. The output signal is fed to the local oscillator 27, and also to the control oscillator 28 by transmission over the service information path. The threshold circuit produces three indications: the first indication when the level of the received signal is convenient and; consequently, no measure is to be taken, the second indication when the level is too high; and the third indication when the level is too low. Signal shaping circuits 69 and 70 process the information of the received signal levels in order to determine the frequency of the control oscillators 27 and 28, respectively.

Elements of a preferred arrangement according to the invention will now be described in more detail.

As shown in FIG. 3, because of the difficulty in forming frequency controlled oscillators varying from 50 to 60 GHz, the control oscillator 27 (or 28) is formed by an assembly 71 comprising three elementary oscillators 72, 73 and 74 each having an input for voltage-control of its frequency 76, 77 and 78 and an output 79, 80 and 81. These oscillators may oscillate, for example:
between 50 and 54 GHz for oscillator 72,
between 53 and 57 GHz for oscillator 73, and
between 56 and 60 GHz for oscillator 74.
The assembly 71 has an input 85 to receive a frequency-control voltage and an output 87 to produce the signal at the carrier frequency. A switch 88 connects the input 85 to one of the control inputs 76, 77 and 78 of the oscillators 72, 73 and 74. A switch 89 of the radio-frequency type connects the output 87 to one of the outputs 79, 80 and 81. The switching positions of the switches 88 and 89 are determined by a switch control circuit 90 controlled whether one of said oscillators 72, 73 and 74 is put into operation as a function of the frequency which is presented in a digital form at the voltage control input 31 (32) of the oscillator 27 (28). Although this has not been shown, it will be evident that the oscillators which are not used are not fed. To this assembly 71 is associated a phase control loop comprising:
a directional coupler 95 capturing part of the wave at output 87,
a mixer 97 operating with the harmonics from a dielectric resonator oscillator 98 whose nominal frequency is of the order of several Gigaherz and which is preferably thermally stabilized
a programmable digital divider 100 to divide the frequency of the mixer output signal by a number applied to the input 31, and
a phase comparator 101 comparing the phase of the signal at the output of divider 100 with
a reference signal from a quartz oscillator 105 whose nominal frequency is of the order of several Megaherz.

The send circuit 25 (26) is simply constituted by a PIN-diode amplitude modulator receiving directly the modulation signals representing the information to be transmitted.

The signal-shaping circuit 69 is constituted by an adder 102 cooperating with an accumulator register 104 whose output is connected to the input 31. Information indicating that the signal level is too high has to cause an increase Δf which is added to the contents of the accumulator 104, and information indicating that the level is too low has to cause a decrease of Δf which is thus subtracted from the contents of the accumulator 104. In order to keep the frequency differences within the desired zone, stop circuits are provided comprising a multiplexer 110 which substitutes the value "0" for Δf, 1) when the value Δf indicates that the frequency needs augmenting but this frequency has already reached its maximum value and 2) when, alternatively, the value Δf indicates that the frequency needs reducing but this frequency has already reached its minimum value. The position control of this multiplexer 110 is provided by a decoding circuit 112 which detects the conditions set out above.

The switch control circuit 90 analyses the two most significant bits at the input 31 in order to determine whether oscillator 72, 73 or 74 is to be put into operation, whereas the remaining less significant bits determine the number by which the divider 100 divides the signal frequency at its input.

The signal-shaping circuit 70 is constituted in the same manner but takes the frequency shift into account which exists between the frequencies FP12 and FP21 (for example, one has |F12−F21|=2FI) to ensure the full duplex link. It should be observed that the mixer (49 or 50) of one of the units 1 or 2 will operate in the supradyne mode whereas the mixer of the other unit will operate in the infradyne mode. The value FI will be sufficiently low for the difference in attenuation between the signals SP12 and SP21 to be negligible.

A variant of the invention consists of using three oscillators having a reduced frequency tuning range solely intended to compensate for their natural thermal drift.

The distant units use the same assembly 71 but with predetermined fixed frequencies, for example:
for unit 1 the oscillators 72, 73 and 74 will have the following fixed values:
52.25 GHz
56.00 GHz
59.75 GHz
whereas for unit 2 the frequencies will be:
52.00 GHz
55.75 GHz
59.59 GHz.

In order to realise the multiplexing of the useful and the service information performed by the multiplexers 61 and 66, a further possible variant consists of amplitude modulation (modulation depth of the order of 2 dB) of the pulses representing the useful information with a 30 kHz sub-carrier frequency-modulated by the service information. In FIG. 4, shows the multiplexer 64 having a frequency modulator 100 and an amplitude modulator 105. As shown in FIG. 5, at the receive end the demultiplexer 55 will comprise a receive unit 200 to recover the useful information. A bandpass circuit 201 centered on the sub-carrier frequency will supply the information to a receive unit 205 which will recover the service information. The advantage obtained is that the service information has a low bit rate and thus a low error rate, which makes it possible to manage the link, although the transmission of useful information may be considerably degraded.

We claim:
1. An information transmission arrangement comprising at least a first and a second transceiver unit located in a propagation medium having an attenuation which varies as a function of frequency used for transmission, wherein said first transceiver unit comprises a send section having a control oscillator, a frequency variation controller for varying a first frequency generated by said control oscillator, and means for transmitting useful information by modulating a carrier signal having a carrier frequency having a given relationship to said first frequency, and said second transceiver unit comprises a receive section for receiving said carrier signal and said useful information, means for measuring the level of the received carrier signal, and means for sending service information related to the measured level of the received carrier signal, for use by said frequency variation controller, characterized in that said frequency variation controller initially controls said first frequency to a value such that said carrier frequency is in a frequency zone in which attenuation varies generally monotonically within said zone, said means for sending service information comprises means for comparing said measured level to a reference value to provide an indication from a plurality of indications, one of said indications being that the measured level is too high, and another of said indications being that the measured level is too low; and means for providing said service information having a value related to said indication of said plurality of indications provided, and in response to receipt of service information related to said one indication, said frequency variation controller varies the first frequency in a first direction corresponding to an increase in carrier frequency attenuation; and in response to receipt of said service information related to said another of said indication, said frequency variation controller varies the first frequency in a direction opposite said first direction.

2. An arrangement as claimed in claim 1, further characterized in that said plurality of indications includes three indications: a first indication when said measured level differs from said reference value by less than a given threshold, a second indication which is said one indication, and a third indication which is said another indication.

3. An arrangement as claimed in claim 2, further comprising a stop circuit for substituting said first indication when the indication provided by said means for comparing would cause the carrier frequency to be changed to a frequency outside said zone.

4. An arrangement as claimed in claim 1, further comprising a stop circuit for substituting a no-change indication when the indication provided by said means for comparing would cause the carrier frequency to be changed to a frequency outside said zone.

5. An arrangement as claimed in claim 1, further characterized in that the propagation medium is the earth's atmosphere, and said zone is between approximately 50 GHz and 60 GHz.

6. An arrangement as claimed in claim 1, further characterized in that said control oscillator comprises a plurality of oscillators, each generating a frequency having a respective frequency range within said zone; said frequency variation controller comprises means for selecting and controlling one of said plurality of oscillators, responsive to the frequency to be generated; and said means for transmitting comprises means for selecting an output of the selected one of said plurality of oscillators to provide the carrier frequency.

7. An arrangement as claimed in claim 1, characterized in that said means for sending service information further comprises multiplexing circuits for sending said useful information at a high rate and said service information at a low rate over said carrier signal.

8. A transceiver for use in information transmission in a propagation medium having an attenuation which varies as a function of frequency used for transmission, wherein said transceiver comprises a send section having a control oscillator, a frequency variation controller for varying a first frequency generated by said control oscillator, means for transmitting useful information by modulating a carrier signal having a carrier frequency with a predetermined relationship to said first frequency, and means for receiving service information wherein the value of said service information is related to a measured level of the transmitted carrier frequency as received by a remote unit, for use by said frequency variation controller, characterized in that said frequency variation controller initially controls said first frequency to a value such that said carrier frequency is in a frequency zone in which attenuation varies generally monotonically within said zone, and in response to receipt of said service information having a value indicating that the measured level is too high, said frequency variation controller varies the first frequency in a first direction corresponding to an increase in carrier frequency attenuation; and in response to receipt of said service information having a value indicating that the measured level is too low, said frequency variation controller varies the first frequency in a direction opposite said first direction.

9. An arrangement as claimed in claim 8, further characterized in that the propagation medium is the earth's atmosphere, and said zone is between approximately 50 GHz and 60 GHz.

10. An arrangement as claimed in claim 8, further characterized in that said control oscillator comprises a plurality of oscillators, each generating a frequency having a respective frequency within said zone; said frequency variation controller comprises means for selecting and controlling one of said plurality of oscillators, responsive to the frequency to be generated; and said means for transmitting comprises means for selecting an output of the selected one of said plurality of oscillators to provide the carrier frequency.

11. An arrangement as claimed in claim 8, further characterized in that the propagation medium is the earth's atmosphere, and said zone is between approximately 50 GHz and 60 GHz, and said control oscillator comprises a plurality of oscillators, each generating a frequency having a respective frequency range within said zone; said frequency variation controller comprises means for selecting and controlling one of said plurality of oscillators, responsive to the frequency to be generated; and said means for transmitting comprises means for selecting an output of the selected one of said plurality of oscillators to provide the carrier frequency.

12. A transceiver for use in information transmission in a propagation medium having an attenuation which varies as a function of frequency used for transmission, comprising a receive section for receiving a carrier signal having a carrier frequency, modulated by useful information; means for measuring the level of the received carrier signal; and means for transmitting service information related to the measured level of the received carrier frequency, for use by a frequency variation controller, which controls the carrier frequency such that said carrier frequency is in a predetermined zone in which the attenuation varies generally monotonically within said zone, characterized in that said means for transmitting service information comprises means for comparing said measured level to a reference value to provide an indication from a plurality of indications, one of said indications being that the measured level is too high, and another of said indications being that the measured level is too low; and means for providing said service information having a value related to said indication of said plurality of indication provided wherein said plurality of indications includes three indications: a first indication when said measured level differs from said reference value by less than a given threshold, a second indication which is said on indication, and a third indication which is said another indication.

13. An arrangement as claimed in claim 12, further comprising a stop circuit for substituting one of a no-change indication and said first indication when the indication provided by said means for comparing would cause the carrier frequency to be changed to a value outside said predetermined zone.

14. An arrangement as claimed in claim 12, further characterized in that the propagation medium is the earth's atmosphere, and said predetermined zone is between approximately 50 GHz and 60 GHz.

* * * * *

UNITED STATES PATENT AND TRADEMARK OFFICE
CERTIFICATE OF CORRECTION

PATENT NO. : 5,159,704

DATED : October 27, 1992

INVENTOR(S) : Claude Pirolli et al.

It is certified that error appears in the above-identified patent and that said Letters Patent is hereby corrected as shown below:

On the title page, Item [73],

The assignee is incorrect, should read as follows: --Telecommunications Radioelectriques et Telephoniques T.R.T.--

Signed and Sealed this

Twenty-sixth Day of October, 1993

Attest:

BRUCE LEHMAN

Attesting Officer

Commissioner of Patents and Trademarks